(12) United States Patent
Bachmann et al.

(10) Patent No.: US 7,584,997 B2
(45) Date of Patent: Sep. 8, 2009

(54) SEATBELT LOCK

(75) Inventors: Roland Bachmann, Sindelfingen (DE); Karl-Heinz Baumann, Bondorf (DE); Michael Fehring, Neuhausen (DE); Rainer Justen, Altdorf (DE); Nadja Nilgen, Hamburg (DE); Rodolfo Schoeneburg, Hechingen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 10/539,595

(22) PCT Filed: Jul. 29, 2003

(86) PCT No.: PCT/EP03/08343

§ 371 (c)(1), (2), (4) Date: Jun. 26, 2006

(87) PCT Pub. No.: WO2004/054853

PCT Pub. Date: Jul. 1, 2004

(65) Prior Publication Data

US 2006/0249946 A1 Nov. 9, 2006

(30) Foreign Application Priority Data

Dec. 18, 2002 (DE) .............................. 102 59 635

(51) Int. Cl.
*B60R 22/00* (2006.01)

(52) U.S. Cl. .................. 280/801.1; 280/805; 280/806; 180/268; 297/480

(58) Field of Classification Search ............. 280/801.1, 280/803, 805, 806, 807; 297/480
See application file for complete search history.

(56) References Cited

U.S. PATENT DOCUMENTS

| 5,290,062 | A | * | 3/1994 | Fohl | ........................ 280/801.2 |
| 5,374,110 | A | * | 12/1994 | Hiramatsu | .................. 297/480 |
| 5,607,185 | A | | 3/1997 | Isaji et al. | |
| 5,762,372 | A | | 6/1998 | Koujiya et al. | |

(Continued)

FOREIGN PATENT DOCUMENTS

DE 1 411 953 1/1969

(Continued)

*Primary Examiner*—Toan C To
(74) *Attorney, Agent, or Firm*—Crowell & Moring LLP

(57) ABSTRACT

A seatbelt lock includes a preventive tensioning device which moves a seatbelt lock from an operating position into a lowered safety position with respect to the operating position, an energy accumulator, and a drive unit. The seatbelt lock is maintained preloaded in an operating position by means of the energy accumulator, and the drive unit transfers the seatbelt lock from the safety position back into the operating position.

2 Claims, 5 Drawing Sheets

U.S. PATENT DOCUMENTS

| | | | | |
|---|---|---|---|---|
| 5,794,978 A * | 8/1998 | Nishide | | 280/806 |
| 6,076,856 A * | 6/2000 | Wang et al. | | 280/806 |
| 6,196,633 B1 * | 3/2001 | Yamamoto et al. | | 297/474 |
| 6,237,958 B1 * | 5/2001 | Patrickson | | 280/806 |
| 6,460,935 B1 | 10/2002 | Rees et al. | | |
| 6,523,771 B2 * | 2/2003 | Sumiyashiki | | 242/383.2 |
| 6,702,056 B2 * | 3/2004 | Tanaka et al. | | 180/269 |
| 6,726,249 B2 * | 4/2004 | Yano et al. | | 280/805 |
| 6,726,250 B2 * | 4/2004 | Ennerdal | | 280/806 |
| 6,908,112 B2 * | 6/2005 | Yano et al. | | 280/805 |
| 6,932,324 B2 * | 8/2005 | Biller et al. | | 254/230 |
| 6,976,707 B2 * | 12/2005 | Modinger et al. | | 280/806 |
| 7,108,284 B2 * | 9/2006 | Mori et al. | | 280/806 |
| 7,172,218 B2 * | 2/2007 | Nakano et al. | | 280/806 |

FOREIGN PATENT DOCUMENTS

| | | |
|---|---|---|
| DE | 199 41 435 A1 | 4/2001 |
| DE | 100 01 312 A1 | 7/2001 |
| DE | 199 61 799 A1 | 7/2001 |
| DE | 202 09 965 U1 | 10/2002 |
| EP | 0 711 687 A1 | 5/1996 |
| GB | 2 281 189 A | 3/1995 |

* cited by examiner

SEATBELT LOCK

BACKGROUND AND SUMMARY OF THE INVENTION

The invention relates to a seatbelt lock having a preventive tensioning device.

German patent document DE 199 61 799 A1 discloses a seatbelt lock equipped with a preventive tensioning device. If a critical driving situation is sensed, an electric motor brings the seatbelt lock into a lowered intermediate position for about 5 seconds, during which an energy accumulator acts counter to the direction of the electric motor, so that, if no crash occurs it returns the seatbelt lock from the intermediate position to the operating position. If a crash occurs, the preventive tensioning device is actuated pyrotechnically in order to ensure higher restraining forces.

A disadvantage of this device is that after a crash the energy accumulator acts against the return force of the pyrotechnic tensioning device, so that locking means are necessary for the energy accumulator. In other words, the seatbelt lock has to lock from the start of a counterforce on the seatbelt lock which is greater than the tensioning force.

Therefore one object of the invention is to provide a seatbelt lock having a preventive tensioning device whose restraining force remains virtually constant over the entire course of the crash.

According to the invention, a preventive tensioning device is provided which enables a seatbelt lock to be transferred from an operating position into a lowered safety position by an energy accumulator which is maintained preloaded. The return from the safety position to the operating position is performed by a drive unit which is activated when no accident has taken place. The reversible arrangement has the advantage that a high tensioning speed of the seatbelt lock by the energy accumulator is possible, so that belt slack can be removed within the shortest possible time from the belt system in a critical driving situation. If it has small dimensions, the drive unit can be connected to a large transmission in order to produce the force necessary for the return of the seatbelt lock.

The tensioning device can be designed in such a way that the seatbelt lock can additionally be moved from the operating position into a raised comfort position with respect to the operating position. The advantage of this is that, in spite of the sunken arrangement of the seatbelt lock, something which is particularly customary in rear seats, accessibility of the seatbelt lock is improved, while maintaining the preventive safety function. The tensioning device therefore simultaneously performs the function of a seatbelt lock feeder. One advantage of this arrangement is that the seatbelt lock can be arranged in a very low-lying position relative to the seat cushion even in its operating position. This fundamentally improves the restraining action of the belt system, since the belt-branching point is to be arranged as low as possible between the lap and shoulder belt.

In a cost-effective embodiment, the drive unit not only returns the seatbelt lock from the safety position to the operating position, but at the same time transfers the seatbelt lock from the operating position into the comfort position.

In a simple embodiment, the energy accumulator may be designed as a compression spring which is maintained preloaded in a housing and is connected to the seatbelt lock via a draw-in cable. In the case of a critical driving situation, the compression spring is activated, so that it expands in the housing and takes the seatbelt lock along with it via the draw-in cable. However, it is also possible to employ a hydraulic or pneumatic energy accumulator.

In one embodiment, a rack may be fastened to the seatbelt lock and is driven by a corresponding gear of the drive device.

The drive unit may be an electric motor, which is present anyway (for example the electric motor which drives a seat adjuster); or may be a hydraulic pump.

A deflection unit is provided in order to transfer the seatbelt lock into the safety position or into the comfort position. This deflection unit comprises a shaft with a cam track in which a catch engages. Depending on whether or not the catch is in engagement, the shaft is locked or released. Furthermore, a ratchet gear may be provided with a grooved track which is likewise in engagement with the catch.

If a critical driving situation is detected, the compression spring is released, so that the draw-in cable drives the ratchet gear. The engagement between the catch and grooved track is configured geometrically in such a way that, during a preventive operation, the catch slips over the engagement with the grooved track, so that the ratchet gear transmits its movement to the shaft.

If the critical driving situation is not followed by a crash, the shaft and the cam track are driven in the opposite direction by the motor, and the spring is thereby reloaded. However, that only takes place if the catch is not in engagement with the cam track.

If a crash occurs, high tensile forces act on the seatbelt lock. As a result, the ratchet gear is driven, specifically in such a way that the synchronization between the cam track and grooved track is canceled. The catch comes into engagement and thus prevents the spring's being loaded by the high tensile forces.

In order to ensure that the seatbelt lock locks in every position as soon as the tensile force on the seatbelt lock is greater than the tensioning force, a synchronizing unit is provided. In one embodiment, the synchronizing unit comprises locking blocks which are mounted so that they can be rotated relative to one another within the housing for the spring.

Advantageously, the end faces of the locking blocks are designed as tooth flanks in order to realize a drive for the rotary movement of a locking block within the housing.

In a second embodiment, spiral hubs are arranged on a shaft, it being possible by displacing the spiral hubs toward one another to transmit a torque to a ratchet gear.

Other objects, advantages and novel features of the present invention will become apparent from the following detailed description of the invention when considered in conjunction with the accompanying drawings.

DETAILED DESCRIPTION OF THE DRAWINGS

Figure 1:
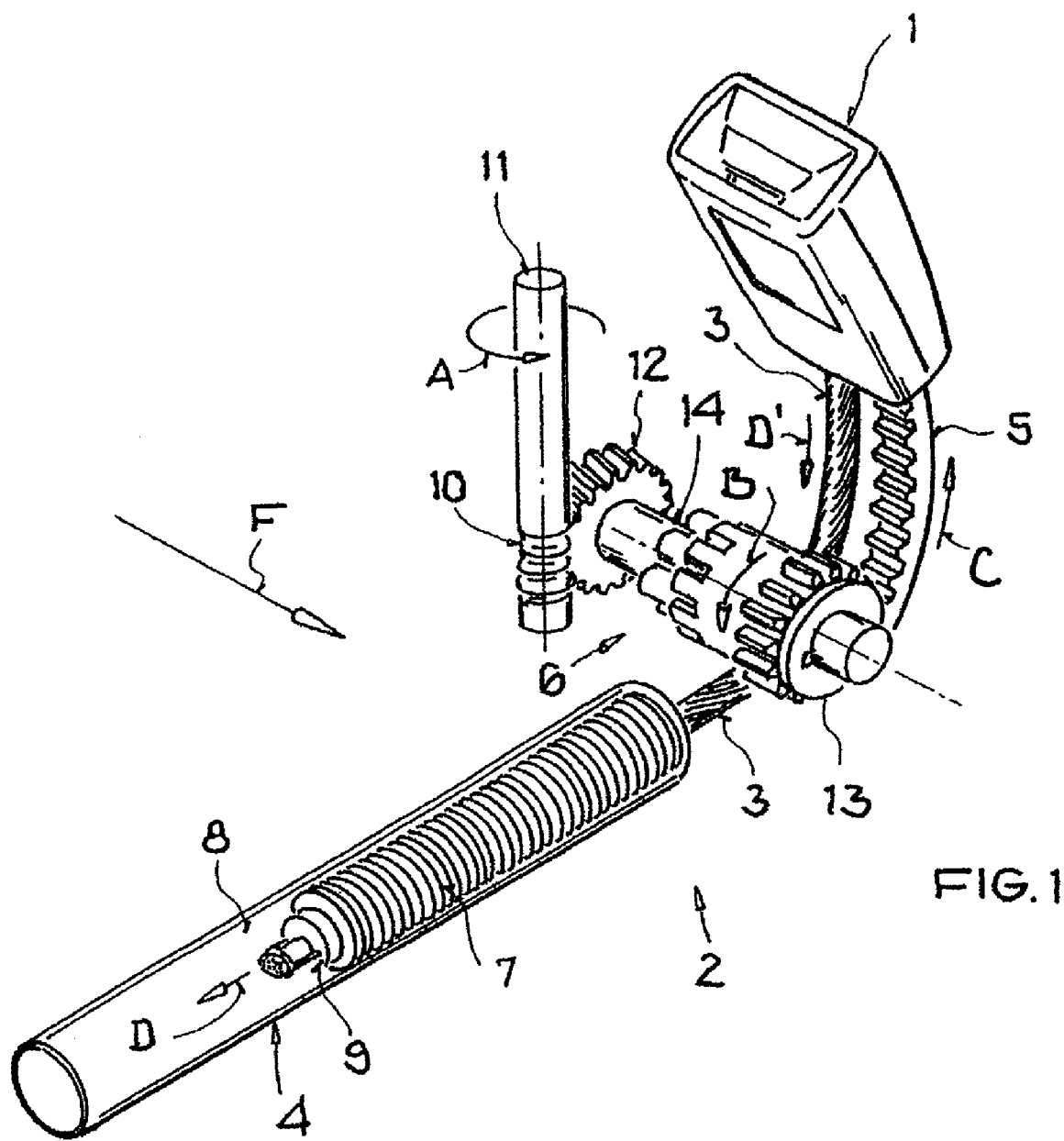
FIG. 1 shows one embodiment of a seatbelt lock.

FIG. 1 is a front, perspective view of a seatbelt lock 1 having a tensioning device 2, with the direction of travel F being indicated by an arrow. The seatbelt lock 1 is in the operating position.

The seatbelt lock 1 is connected to an energy accumulator 4 via a draw-in cable 3 and to a drive unit 6 of the tensioning device 2 via a rack 5.

The energy accumulator 4 comprises a compression spring 7 which is guided in a housing 8 and is maintained preloaded in the housing 8. The compression spring 7 is traversed by the draw-in cable 3 which is fastened to that end 9 of the compression spring 7 facing away from the seatbelt lock 1.

The drive unit 6 is represented only by way of a transmission 10 which comprises a drive shaft 11, a worm gear 12 and a ratchet gear 13. The worm gear 12 and ratchet gear 13 are mounted on a common shaft 14. The ratchet gear 13 is in engagement with the rack 5.

The interaction of the seatbelt lock 1 with the tensioning device 2 is explained hereinbelow with reference to the possible loading scenarios, including comfort adjustment, adjustment during a critical driving situation, and also adjustment during a crash.

In order to transfer the seatbelt lock 1 from its operating position (represented) into a raised comfort position with respect thereto, it is possible for a signal to be sent to the drive unit 6, for example during starting of the engine and simultaneous recognition of the seat occupation, so that the drive shaft 11, by rotating in arrow direction A, drives the worm gear 12 and the ratchet gear 13 in arrow direction B. The engagement of the ratchet gear 13 with the rack 5 causes the rack 5 to advance in direction C, so that the seatbelt lock 1 is raised beyond the operating position. For comfort purposes, the travel of the seatbelt lock 1 can be selected as desired. In the embodiment represented, a travel of up to 80 mm is possible.

After the belt tongue (not shown) has been inserted into the seatbelt lock 1, the drive unit 6 again receives a signal. The sequence of movement occurs in the reverse order until the seatbelt lock is back in its operating position.

If a critical driving situation is detected by appropriate sensor technology, a release mechanism (not shown further) on the energy accumulator 4 receives a signal, so that the compression spring 7 is released in arrow direction D. Because the draw-in cable 3 is fastened to the end 9 of the compression spring 7, the seatbelt lock 1 is correspondingly taken along, so that the seatbelt lock 1 is moved into a lowered safety position as indicated by arrow direction D'. Since the seatbelt lock is a belt-branching point of the lap and shoulder belt, approximately twice the length of the travel is taken from the belt system and the belt slack is thus already removed from the belt system at a very early time. If no accident occurs, a signal is sent to the drive device 6, which again lifts the seatbelt lock 1 into the operating position in the manner described above.

In the event of a crash, the ratchet gear 13 maintains the seatbelt lock 1 in the safety position, it being possible for the crash-active belt tensioning to be performed pyrotechnically on the belt retractor. The belt retractor can be blocked by a belt-sensitive sensor and by a vehicle-sensitive sensor.

The belt tensioning is then performed by the preventive tensioning based on the vehicle movement dynamics or evaluation of the vehicle surroundings. The seatbelt lock is tensioned above a critical threshold, it being necessary for the acceleration of the belt strap material induced by the seatbelt lock on the belt retractor to be great enough for the belt-sensitive sensor to block the belt retractor in order to reduce the belt slack on the occupant. The threshold value for this purpose is 2 g on the belt retractor. By contrast, the belt retractor is blocked by the vehicle-sensitive sensor starting from a vehicle acceleration (in the X/Y plane) of as little as 0.3 g. The blocking of the belt on the belt retractor by the vehicle-sensitive sensor can be performed, by virtue of the vehicle movement dynamics, even before the blocking by the belt-sensitive sensor, which makes it possible to reduce additional belt slack on the occupant.

The reference numbers in the figures which follow are analogous to the reference numbers in FIG. 1 where the design and/or mode of action are identical.

Figure 2:
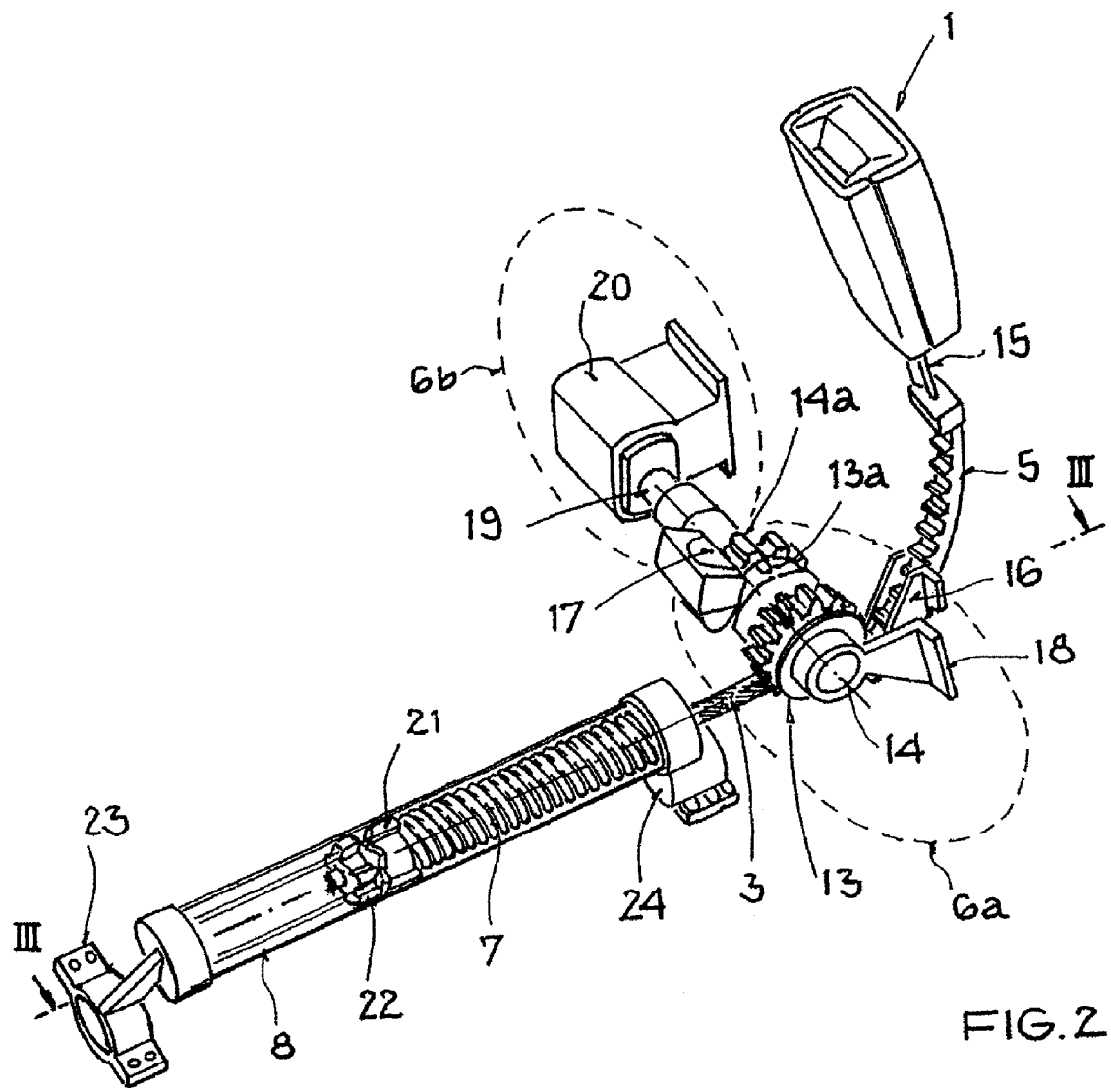
FIG. 2 shows a second embodiment of a seatbelt lock.

FIG. 2 features a conventional seatbelt lock 1 which is fastened to the bent rack 5 via a flexible steel cable 15. This rack 5 is held on the seat frame (not shown here) via a linear guide 16. The task of the linear guide 16 is to make freedom of movement in the Z direction possible for the rack 5 and consequently for the seatbelt lock 1.

The ratchet gear 13 acts on the rack 5. A grooved track 13a is formed on the outside of this ratchet gear 13. A spring-loaded catch 17 is in engagement on this surface. The flexible draw-in cable 3 connects the ratchet gear 13, which is mounted on a shaft 14, to the spring 7. The shaft 14 is fastened to the seat frame by means of a mount 18 and via a motor shaft 19. A cam track 14a is represented on the shaft 14. The spring-loaded catch 17 is in engagement on this cam track 14a as well. At the end of the motor shaft 19, a motor 20 drives the shaft 14.

The spring 7 and locking blocks 21 and 22 are situated in the housing 8. The housing 8 is fastened to the transverse seat tube (not shown here) via the fastening sleeves 23 and 24.

In principle, the seatbelt lock having a preventive tensioning device can be divided into the drive unit 6 having a deflection unit 6a and a reversing unit 6b and into the tensioning device 2.

The deflection unit 6a comprises the ratchet gear 13, the shaft 14, the catch 17 and also the draw-in cable 3.

The reversing unit 6b comprises the motor 20 and also the motor shaft 19.

The tensioning device 2 comprises housing 8, the spring 7, a spring-locking means (locking blocks 21, 22, shown in greater detail in FIG. 4) and fastening means in the form of fastening sleeves 23 and 24.

An advantage of this embodiment is the use of the accumulator having high energy density (spring 7) for the tensioning operation and an energy accumulator having low energy density (motor 20) for the slow reversing operation, which is advantageous in terms of package and weight.

The tensioning device 2 is fitted not onto the seat but into the seat in this embodiment. The divided arrangement of the individual assemblies has been chosen for reasons of optimal division of the components into the free gaps of the seat unit. However, a different division is also conceivable in the case of other seat arrangements.

The retaining functions of the spring 7 and the seatbelt lock 1 have been separated for reasons of the differing requirements. In this embodiment, the spring must apply a force of about 300-400 N in order to tension the belt, and accordingly can be retained only with this force. On account of the high dynamic loads in the event of a crash and the resulting legal requirements, the seatbelt lock has to satisfy a retaining force of 19 kN.

For this reason, the spring 7 is locked, or unlocked for tensioning, only in its end position in which it is operationally ready for the tensioning operation.

Figure 4:
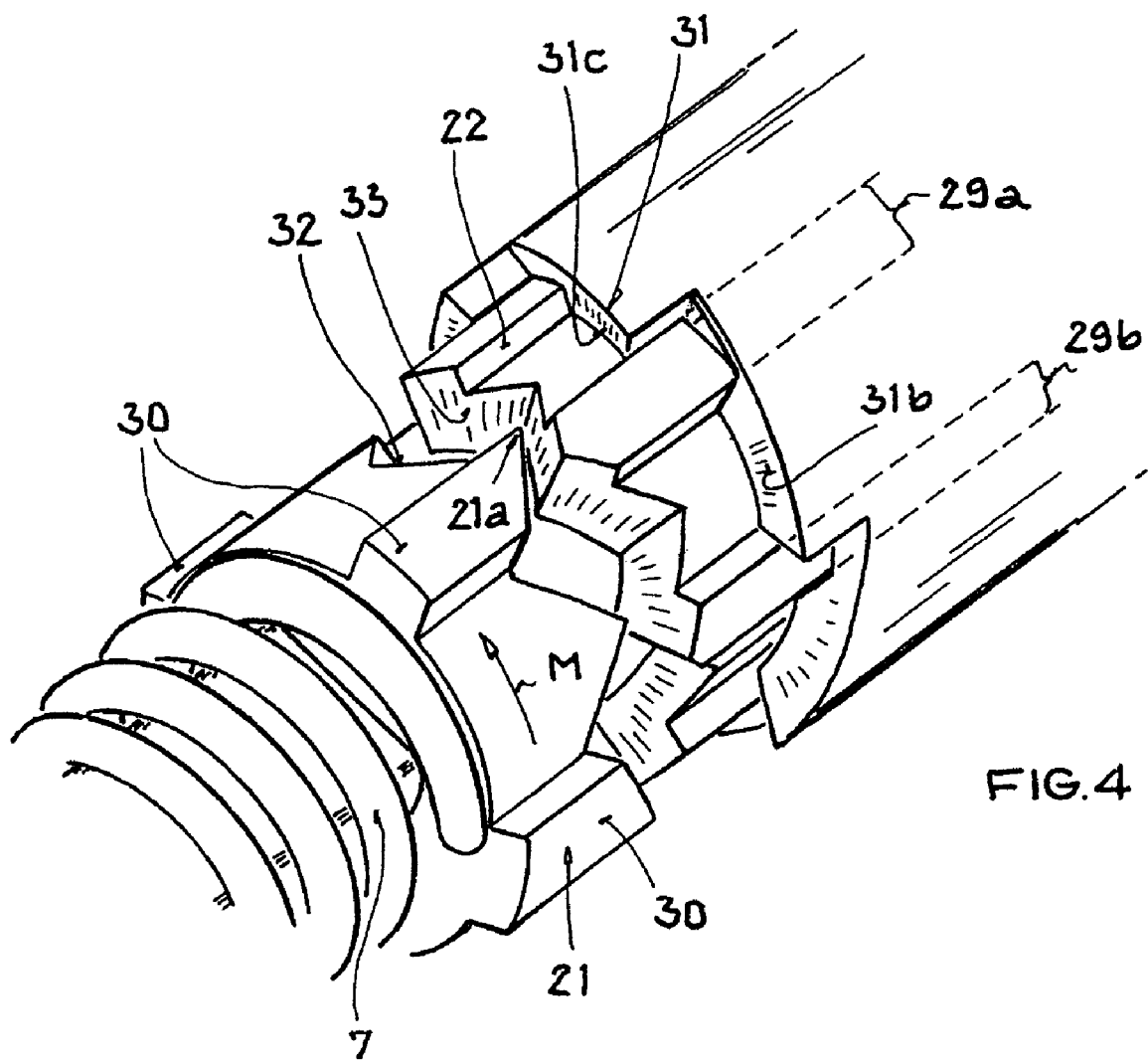
FIG. 4 shows a detail view of a retaining and releasing unit according to FIG. 3.

In order to ensure that the seatbelt lock locks in every position as soon as the tensile force on the lock is greater than the tensioning force, a synchronizing unit assigned to the tensioning device has been designed for locking (FIG. 4).

Such locking even during the proceeding tensioning operation, (i.e., not only in the end positions) is necessary, since initiation of the reversible seatbelt lock tensioning at the correct time cannot be ensured in all situations. Thus, for example, the tensioning operation and the start of the forward displacement of the occupant may overlap, so that the seatbelt lock 1 does not reach its intended end position and the locking unit arranged there. The entire preventively tensioned travel of the seatbelt lock 1 would consequently cancel out again.

Figure 3:
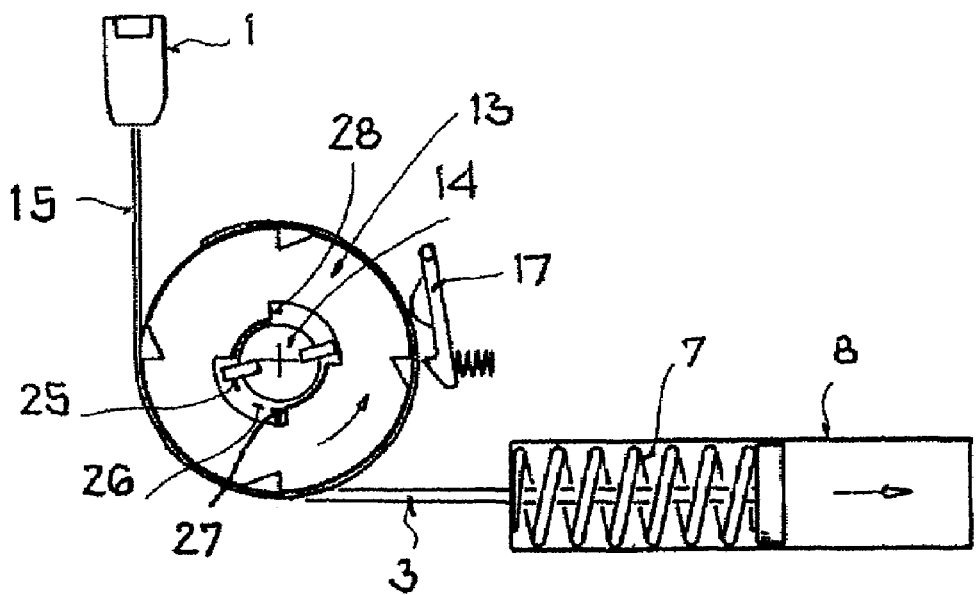
FIG. 3 shows a cross section along line III-III according to FIG. 2.
Figure 3:
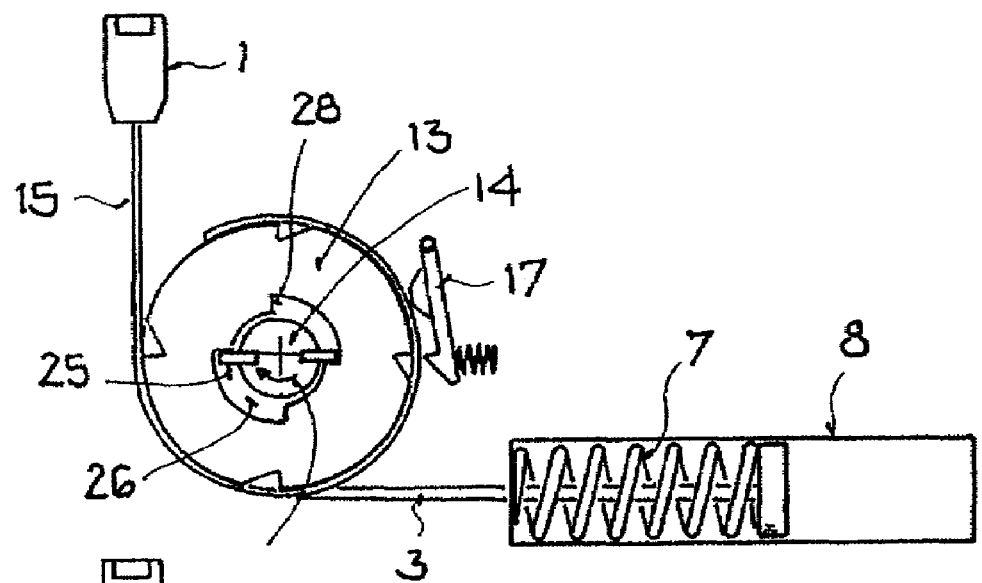
Figure 3:
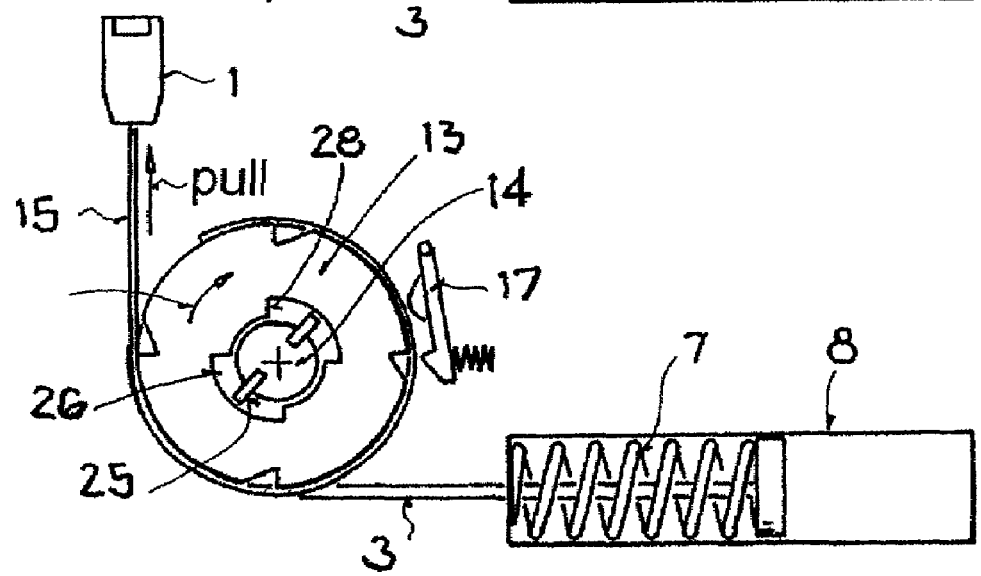

FIG. 3 provides a more detailed illustration of the structure of the deflection unit 6a and of the reversing unit 6b. The shaft 14 is represented with the cam track 14a, while the ratchet gear 13 comprises the grooved track 13a (FIG. 2). The spring-loaded catch 17 is in engagement both with the cam track and the grooved track. A longitudinal spring 25 is situated on the shaft 14. The ratchet gear 13 is provided on its inside with an angular groove 26. This angular groove 26 allows the ratchet gear 13 to have two operating positions, rotated through about 90°, with respect to the shaft 14, depending on which stop 27 or 28 the longitudinal spring 25 is situated against on the angular groove 26.

The mode of operation of the deflection unit 6a and reversing unit 6b is as follows in the individual operating states:

During the tensioning operation (i.e., during a critical driving situation), the spring 7 pulls in the seatbelt lock 1. The catch 17 does not latch but, due to its geometry, slides over the engagement with the grooved track 13a. The ratchet gear 13 turns the shaft 14 around with it counterclockwise. The stops 27 are in engagement.

During the reversing operation (i.e., no accident has taken place), the seatbelt lock 1 is extended again by rotation of the shaft 14, and the spring 7 is consequently reloaded. The catch 17 here skips over the engagement, activated by the cam track 14a on the shaft 14. The stops 27 are in engagement.

When there is a sudden pull on the seatbelt lock, for example during an accident, the ratchet gear 13 turns round on the shaft 14 as far as the stops 28, so that the synchronization between the cam track 14a and grooved track 13a is canceled. The catch 17 latches in, and the motor stops.

FIG. 4 shows the releasing unit in a detail view. The spring 7 is held or released by means of the releasing unit and is implemented separately in this embodiment. The motor 20 is used to generate a release pulse. For this purpose, the releasing unit 2c has been integrated at one end of the spring in the manner of a ballpoint pen mechanism. This makes it possible to carry out the releasing operation for tensioning purposes and the reversing operation with only one direction of rotation of the motor. The opposite direction of rotation can be used for an additional comfort application, for example as a lock feeder for extending the seatbelt lock 1.

However, it is not absolutely necessary to use this releasing unit 2c. If it is not required to use the second direction of rotation of the motor for comfort purposes, then this can be used to activate the release catch.

The flexible draw-in cable 3 transmits the force of the spring 7 via the locking blocks 21 and 22. The flexible draw-in cable 3 is fastened to the locking block 22. In this exemplary embodiment, a total of six grooves 29 are produced in the spring housing 8, with three grooves being formed deeper 29a and three grooves being formed shallower 29b in each case. The grooves 29a and 29b are each arranged in alternating fashion over the circumference. The diameter of the locking block 21 is such that it can be sunk into the grooves 29a and 29b. This means that the locking block 21 is always guided in the groove region. The locking block 21 has tenons 30 on its periphery, which are dimensioned so that they can only enter the deep grooves 29a.

In order to reach the end position, the locking block 21 is withdrawn from the groove region across the transition boundary 31. The touching end faces 32 and 33 of the two locking blocks 21 and 22 are designed as tooth flanks. This arrangement serves to drive the necessary rotary movement of the locking block 21.

In the rest position, locking block 21 is situated at the transition boundary 31, specifically with the point 21a of the locking block 21 on the notch 31c of the transition boundary 31 at the groove 29b. The end faces 32 and 33 of the two locking blocks 21 and 22 stand one on the other in this position in such a way that a torque M acts on the locking block 21. Twisting is prevented by means of the surface 31b at the transition boundary 31.

If the locking block 21 is now moved to the left across the transition boundary 31, the acting torque M rotates the block with respect to the fixed locking block 22 as soon as the locking block 21 is no longer blocked by surface 31b. If locking block 22 is released, the surfaces 31c thus rotate the locking block 21 in such a way that it slides into the groove 29a and is no longer blocked.

The tensioning operation is consequently initiated; the spring is able to release. In this position, the torque M which tends to rotate the locking block 21 then acts again, but is blocked by the groove 29a. If the spring 7 is then loaded in such a way that the locking block 21 is moved to the left across the transition boundary 31, locking block 22 rotates again and the system passes to the rest position.

Figure 5:
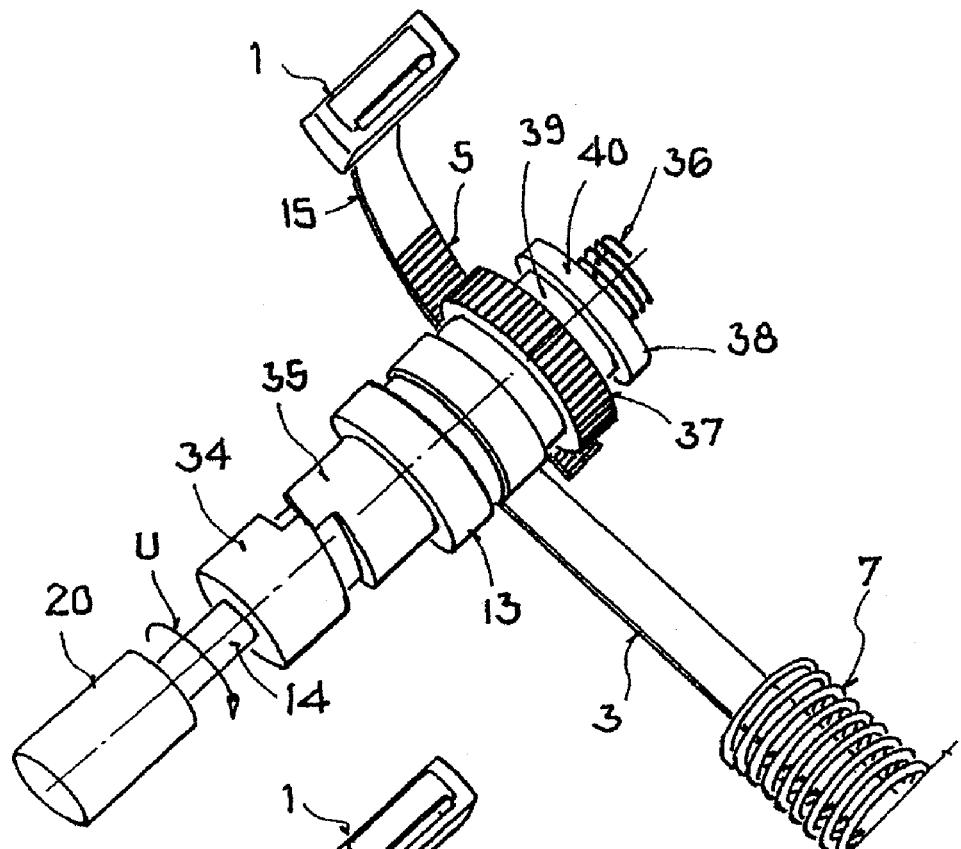
FIG. 5 shows a third embodiment of a seatbelt lock in a reversing position.
Figure 6:
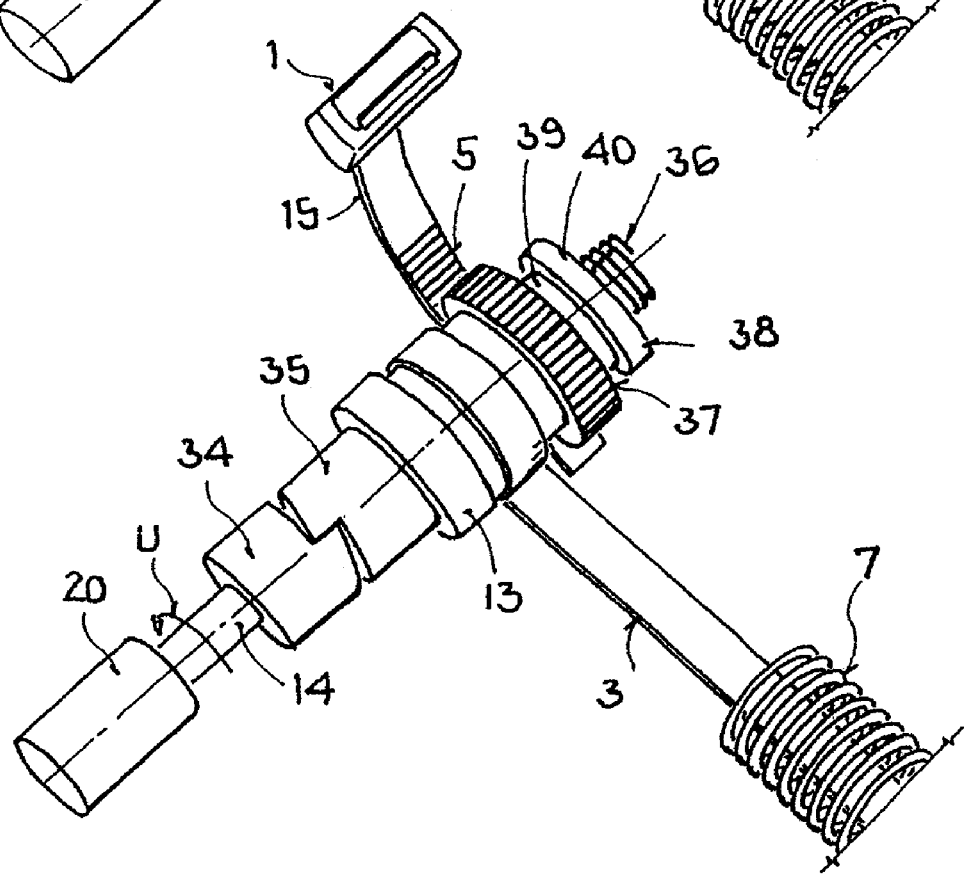
FIG. 6 shows the seatbelt lock according to FIG. 5 in a tensioning position.

FIGS. 5 and 6 (in which identical reference numbers again denote identical components) show an alternative version of the synchronizing unit, which in this case is arranged not in the housing 8 but in the region of the deflection unit 6a. This alternative design provides a unit which two spiral hubs 34 and 35, a spring unit 36, a pin disk 37 and also a perforated disk 38.

In FIG. 5, the two spiral hubs 34 and 35 overlap one another at the point shown. As a result, the spring unit 36 is compressed and grooves 39 of the pin disk 37 are in engagement with openings 40 in the perforated disk 38.

If a releasing operation is then carried out by rotating the electric motor 20 in the clockwise direction U, the spiral hubs 34 and 35 spring together as a result of the pressure of the spring unit 36 after the rotation over the vertical flank represented. As a result, the pin disk 37 springs from the perforated disk 38 and releases it, so that the spring 7 rotates the ratchet gear 13 on the shaft 14. The rotating ratchet gear 13 thereby tensions the seatbelt lock 1.

In this arrangement, the shaft 14 rotates oppositely to the clockwise direction U, specifically through a maximum of 270° in such a way that the two spiral hubs 34 and 35 are not axially stressed again.

If a reversing operation takes place by rotating the electric motor in the clockwise direction, then the oblique faces of the two spiral hubs 34 and 35 will be stressed with respect to the pin disk 37 and the perforated disk 38 in such a way that the seatbelt lock 1 is reversed, specifically for such time until the pin disk 37 again engages in the perforated disk 38. The initial state is thus reestablished.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A seatbelt locking apparatus comprising:
   a seatbelt lock that is moveable between an operating position and a safety position, which safety position is lowered relative to said operating position; and
   a preventive tensioning device which is operable to move said seatbelt lock between said operating position and said safety position, and which comprises an energy accumulator and a drive unit that are coupled to said seatbelt lock; wherein,
   said energy accumulator is maintained in a preloaded state when said seatbelt lock is in said operating position, and is releasable to move said seatbelt lock from said operating position to said safety position;
   said drive unit is operable to move said seatbelt lock from said safety position back into said operating position; and
   said drive unit is further operable to move said seatbelt lock from said operating position into a comfort position, which is raised relative to said operating position.

2. A synchronizing unit for a seatbelt lock having a preventive tensioning device for controlling tensioning, reversing and locking of said seatbelt lock, said synchronizing unit comprising:
   first and second locking blocks which are mounted within a spring housing of a spring for driving said preventive tensioning device, such that said locking blocks are rotatable relative to each other; wherein,
   an axial end of said first locking block abuts and engages with an axial end of said second locking block under tension of said spring; and
   locking and releasing of said preventive tensioning device are controlled by a relative rotational position of said first and second locking blocks.

* * * * *